(12) United States Patent
Okada et al.

(10) Patent No.: US 6,497,846 B1
(45) Date of Patent: Dec. 24, 2002

(54) EXHAUST GAS PURIFYING SYSTEM FOR INTERNAL COMBUSTION ENGINE

(75) Inventors: Keiji Okada, Kanagawa (JP); Kazuhiko Kanetoshi, Yokohama (JP); Hirofumi Tsuchida, Kanagawa (JP); Akira Tayama, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/370,885

(22) Filed: Aug. 10, 1999

(30) Foreign Application Priority Data

Aug. 12, 1998 (JP) ............................. 10-227474

(51) Int. Cl.$^7$ .............................. F01N 3/00; F01N 3/20
(52) U.S. Cl. ........................ 422/171; 422/177; 422/180; 422/108; 422/110; 60/274; 60/285; 60/297
(58) Field of Search ................................. 422/183, 108, 422/110, 168, 169, 170, 171, 172, 177, 180, 182, 211, 222; 60/284, 285, 286, 297, 303, 311, 274

(56) References Cited

U.S. PATENT DOCUMENTS

| 5,738,832 A | 4/1998 | Dogahara et al. ........... 422/171 |
| 5,804,148 A | 9/1998 | Kanesaka et al. ........... 422/174 |

FOREIGN PATENT DOCUMENTS

| JP | 08-296485 | * 12/1986 | |
| JP | 6-241028 | 8/1994 | |
| JP | 7-144119 | 6/1995 | |
| JP | 9-256840 | 9/1997 | |

* cited by examiner

*Primary Examiner*—Hien Tran
(74) *Attorney, Agent, or Firm*—Foley & Lardner

(57) ABSTRACT

An exhaust gas purifying system for a cylinder direct internal combustion engine having a fuel injector valve for directly injecting fuel into a combustion chamber of the engine. The exhaust gas purifying system comprises an adsorbent catalytic converter disposed in an exhaust gas passageway of the engine. The adsorbent catalytic converter including a catalytic element having an adsorption layer. The adsorption layer contains an adsorbent for adsorbing HC (hydrocarbons) of exhaust gas in a first temperature range and to release the adsorbed HC in a second temperature range which is high relative to the first temperature range, and a catalyst component for promoting reaction for oxidizing HC which is released from the adsorbent. A control unit is provided to be programmed to carry out (a) judging that a temperature of the adsorption layer has reaches a releasing level relating to the second temperature range, so as to make a first judgment result; (b) judging that a temperature of exhaust gas flown into the adsorbent catalytic converter will rise upon injection of an additional fuel from the fuel injector valve into the combustion chamber during a time period including an expansion stroke and an exhaust stroke of the engine, so as to make a second judgment result; and (c) causing the fuel injector valve to controllably inject the additional fuel during the time period including the expansion stroke and the exhaust stroke of the engine upon making both the first and second judgment results.

6 Claims, 4 Drawing Sheets

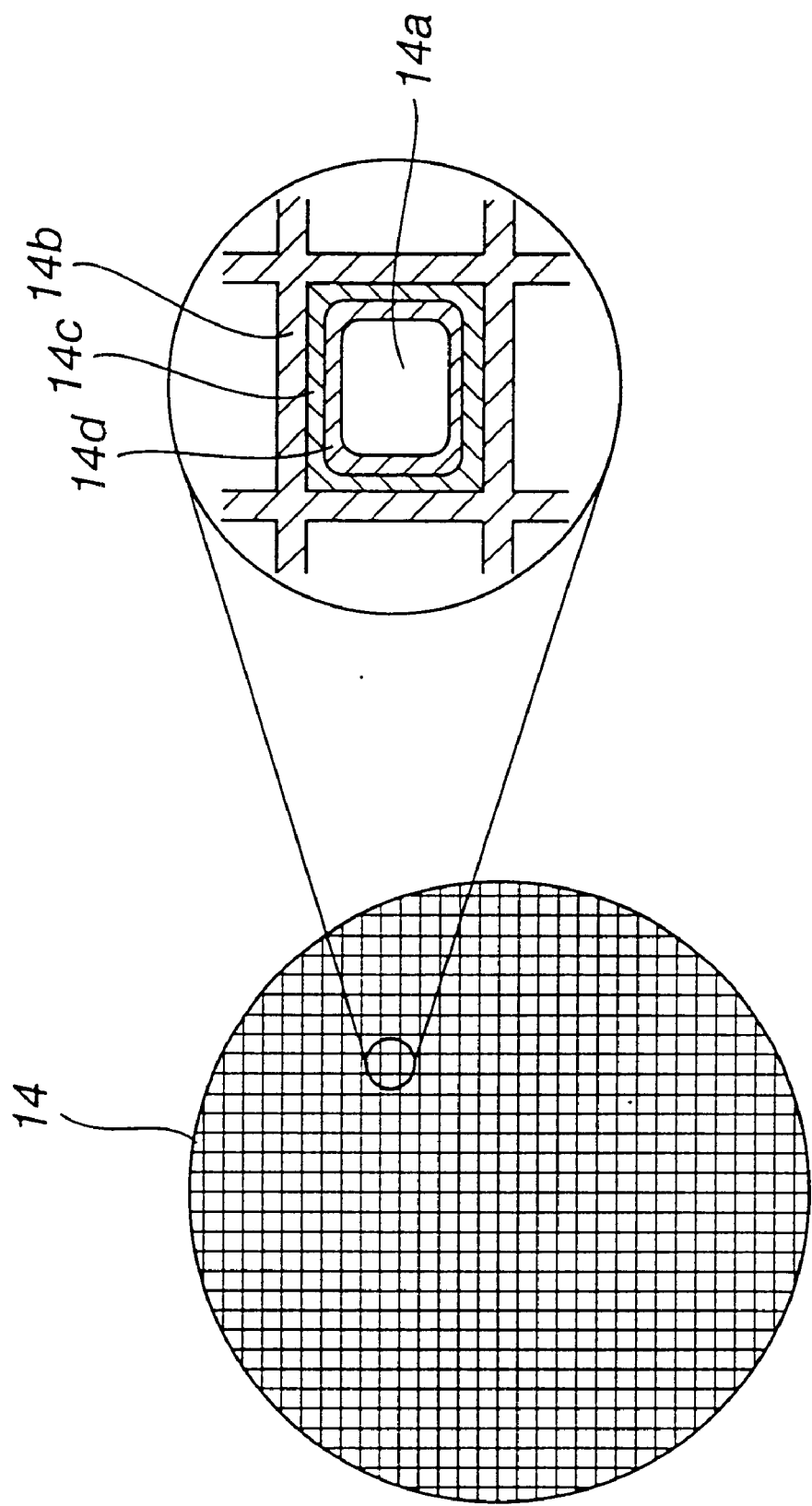

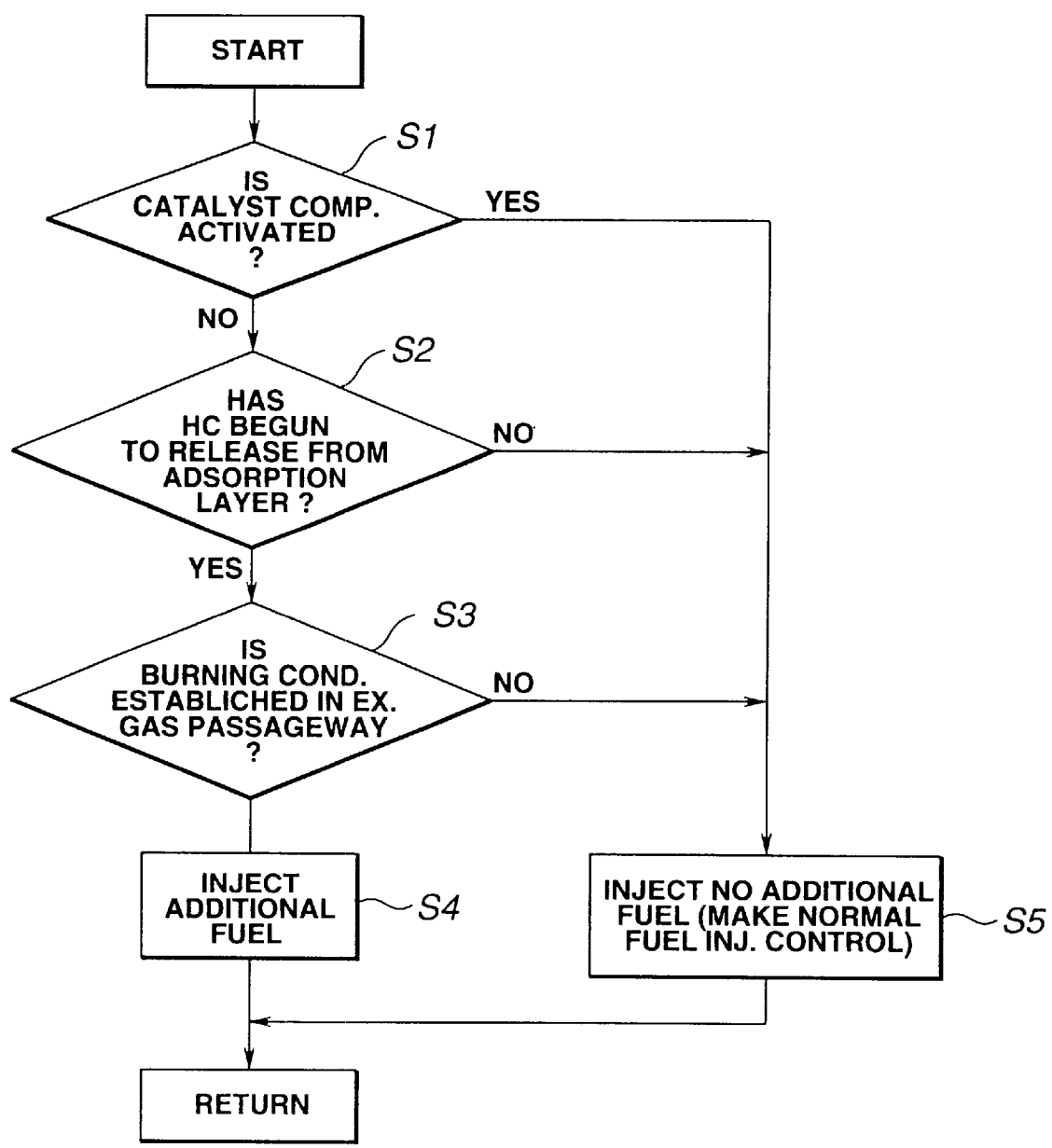

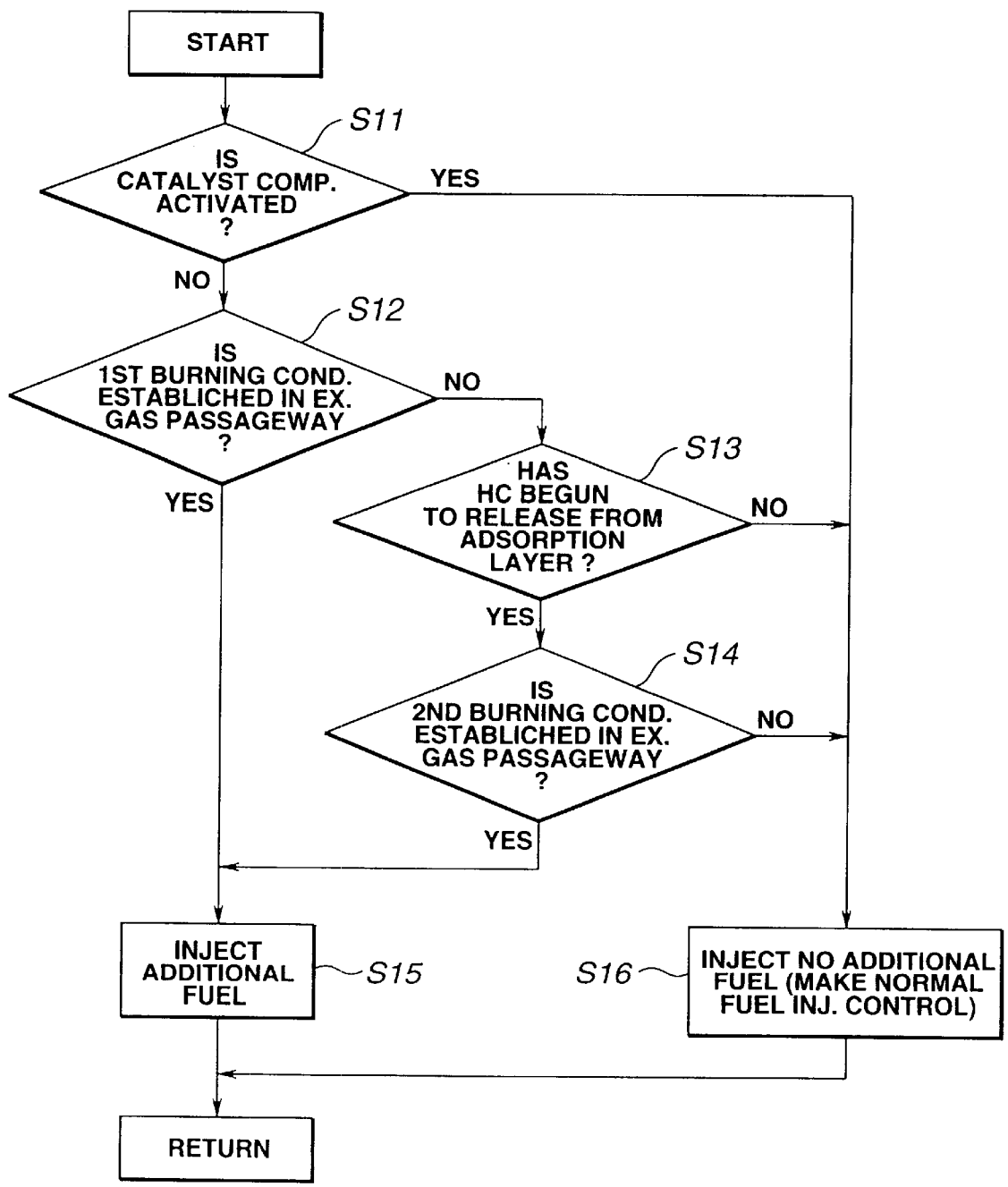

EXHAUST GAS PURIFYING SYSTEM FOR INTERNAL COMBUSTION ENGINE

BACKGROUND OF THE INVENTION

The present invention relates to improvements in an exhaust gas purifying system for a cylinder direct injection internal combustion engine, more particularly to the improvements for achieving exhaust gas purification at a time immediately after starting of the engine.

In order to purify exhaust gas discharged from an automotive internal combustion engine, a catalytic converter including a catalytic element has been hitherto used to be disposed in an exhaust gas passageway of the engine. The catalytic element carries catalyst components such as noble metals (platinum, palladium, rhodium and the like) or other metals. Under the catalytic action of such catalyst components, HC (hydrocarbons), CO (carbon monoxide), NOx (nitrogen oxides) and the like as noxious components in exhaust gas are oxidized or reduced to be converted to harmless gases. Now, it is necessary to raise the temperature of exhaust gas and accordingly the temperature of the catalytic components in order to effect the catalytic action of the catalytic components. For example, it is necessary to raise the temperature of the catalyst components to 200 to 300° C. in order to effect the catalytic action for oxidizing HC. However, at a time immediately after starting of the engine, the temperature of exhaust gas is low and therefore cannot reach a level (for example, above 200° C.) for activating the catalyst components, so that oxidation of HC is hardly accomplished. As a result, an amount of HC emitted to the atmosphere will increase.

In view of the above, in order to solve the above-discussed problems, a variety of techniques have been hitherto proposed as disclosed in Japanese Patent Provisional Publication Nos. 6-241028, 7-144119, 9-256840 and 8-296485.

SUMMARY OF THE INVENTION

Of the above conventional techniques, one disclosed in Japanese Patent Provisional Publication No. 8-296485 is arranged as follows: In a cylinder direct injection internal combustion engine in which fuel is directly injected from a fuel injector valve into an engine cylinder, additional fuel is injected from the fuel injector valve into the engine cylinder in or after expansion stroke of the engine, so that the additional fuel is mixed in its unburned state with air and supplied to an exhaust system so as to be burned around a catalytic element thereby smoothly raising the temperature of catalyst component in the catalytic element.

However, in this conventional technique, there is the fear that the additional fuel cannot be sufficiently burnt, for example, at a time immediately after engine starting at a low temperature. At such a time, the temperature of an exhaust port, an exhaust manifold, an exhaust pipe, and a catalytic converter which form parts of an exhaust gas passageway is low. Accordingly, not only exhaust gas cannot be heated, but also the additional fuel is unavoidably discharged to the atmosphere.

It is, therefore, an object of the present invention to provide an improved exhaust gas purifying system for an internal combustion engine, which can effectively overcome drawbacks encountered in similar conventional exhaust gas purifying systems for internal combustion engines.

Anther object of the present invention is to provide an improved exhaust gas purifying system for an internal combustion engine, which can securely and smoothly raise the temperature of a catalyst component in a catalytic converter and activate the catalyst component, thereby effectively reducing unburned HC emitted to the atmosphere without being equipped with any special exhaust gas heating apparatus.

A further object of the present invention is to provide an improved exhaust gas purifying system for a cylinder direct injection internal combustion engine equipped with an adsorbent catalytic converter having a HC adsorbent, in which additional fuel can be injected from a fuel injector valve into an engine cylinder in case that unburned hydrocarbon adsorbed in the adsorbent is to release before activation of a catalyst component of the catalytic converter with a temperature rise after engine starting at a low temperature.

An aspect of the present invention resides in an exhaust gas purifying system for an internal combustion engine having a fuel injector valve for directly injecting fuel into a combustion chamber of the engine. The exhaust gas purifying system comprises an adsorbent catalytic converter disposed in an exhaust gas passageway of the engine, the adsorbent catalytic converter including a catalytic element having an adsorption layer. The adsorption layer contains an adsorbent which is able to adsorb HC (hydrocarbons) of exhaust gas in a first temperature range and to release the adsorbed HC in a second temperature range higher than the first temperature range, and a catalyst component for promoting reaction for oxidizing HC which is released from the adsorbent. A control unit is provided to be programmed to carry out (a) judging that a temperature of the adsorption layer reaches a releasing level relating to the second temperature range, so as to make a first judgment result; (b) judging that a temperature of exhaust gas flown into the adsorbent catalytic converter will rise upon injection of an additional fuel from the fuel injector valve into the combustion chamber during a time period including an expansion stroke and an exhaust stroke of the engine, so as to make a second judgment result; and (c) causing the fuel injector valve to controllably inject the additional fuel during the time period including the expansion stroke and the exhaust stroke of the engine upon making both the first and second judgment results.

Another aspect of the present invention resides a process for purifying exhaust gas from an internal combustion engine having a fuel injector valve for directly injecting fuel into a combustion chamber of the engine, and equipped with an adsorbent catalytic converter disposed in an exhaust gas passageway of the engine. The adsorbent catalytic converter includes a catalytic element having an adsorption layer. The adsorption layer contains an adsorbent which is able to adsorb HC (hydrocarbons) of exhaust gas in a first temperature range and to release the adsorbed HC in a second temperature range higher than the first temperature range, and a catalyst component for promoting reaction for oxidizing HC which is released from the adsorbent. The process comprises (a) judging that a temperature of the adsorption layer reaches a releasing level relating to the second temperature range, so as to make a first judgment result; (b) judging that a temperature of exhaust gas flown into the adsorbent catalytic converter will rise upon injection of an additional fuel from the fuel injector valve into the combustion chamber during a time period including an expansion stroke and an exhaust stroke of the engine, so as to make a second judgment result; and (c) causing the fuel injector valve to controllably inject the additional fuel during the time period including the expansion stroke and the exhaust stroke of the engine upon making both the first and second judgment results.

BRIEF DESCRIPTION OF THE DRAWINGS

FIG. 2 is an enlarged sectional view of a catalytic element of a catalytic converter forming part of the exhaust gas purifying system of FIG. 1;

FIG. 3 is a flowchart of a routine of control executed by a control unit forming part of the exhaust gas purifying system of FIG. 1; and FIG. 4 is another flowchart of a routine of control executed by a control unit forming part of a second embodiment of the exhaust gas purifying system according to the present invention.

DETAILED DESCRIPTION OF THE INVENTION

Figure 1:
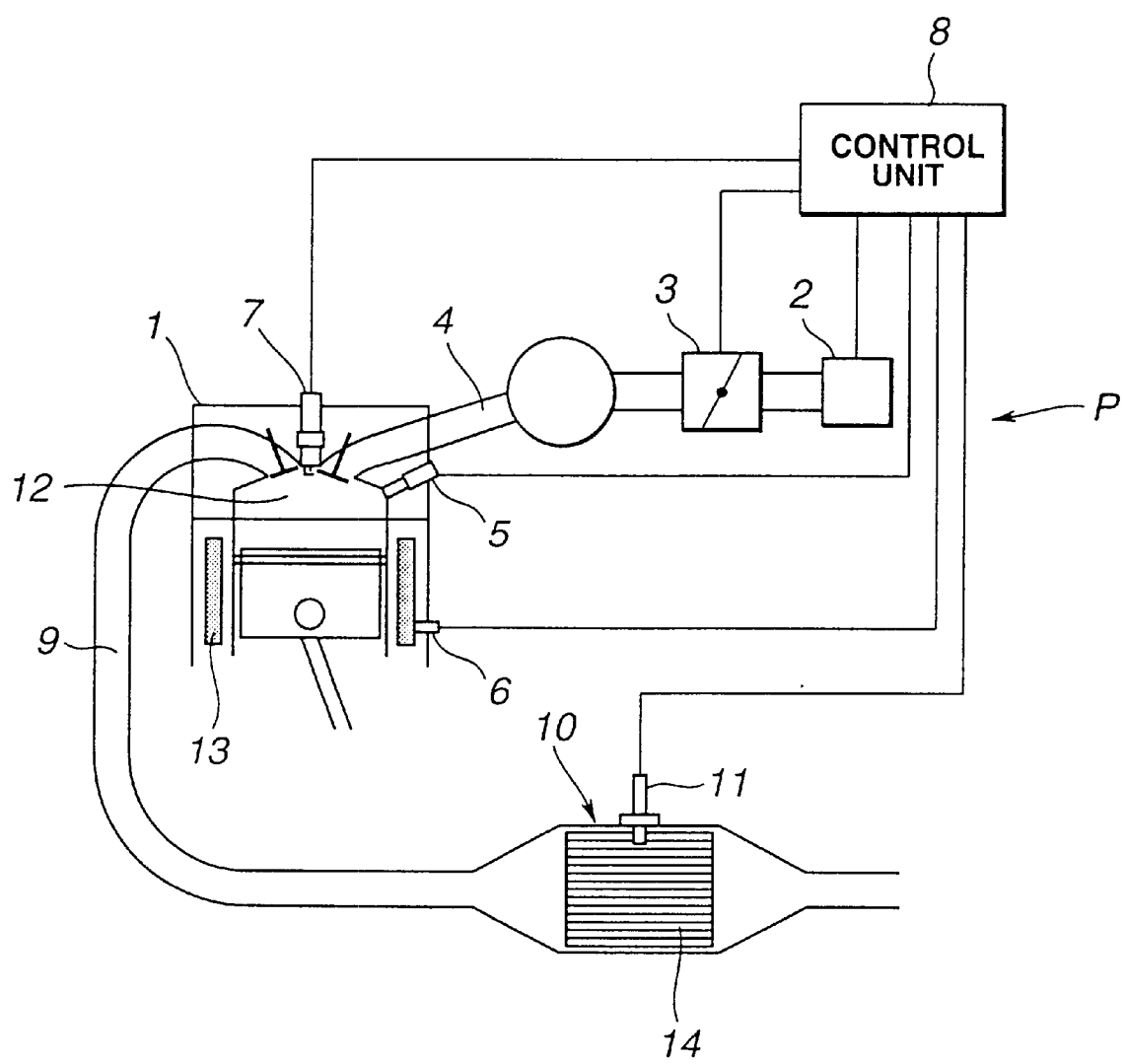
FIG. 1 is a schematic illustration of a first embodiment of an exhaust gas purifying system for an internal combustion engine, according to the present invention.

Referring now to FIG. 1, a first embodiment of an exhaust gas purifying system P is illustrated in combination with an internal combustion engine 1. The engine 1 of this embodiment is for an automotive vehicle and of a four-stroke cycle type having intake stroke, compression stroke, expansion stroke and exhaust stroke. The engine 1 is of a cylinder direct injection type wherein fuel is directly injected into a cylinder or combustion chamber 12 of the engine 1, and therefore is provided with a fuel injector valve 5 whose tip end is exposed in the combustion chamber 12. An spark plug 7 is disposed to project in the combustion chamber 12 and located generally along the axis of the cylinder.

A coolant temperature sensor 6 is provided to detect a temperature of engine coolant in a water jacket 13. The coolant temperature sensor 6 is adapted to generate a detection signal representative of the engine coolant temperature. An air flow meter 2 is disposed in an intake air passageway 4 so as to detect a quantity of intake air passing through the intake air passageway 4. The air flow meter 2 is adapted to generate a detection signal representative of the intake air quantity. A throttle valve 3 is disposed in the intake air passageway 4 so as to control a quantity of intake air flowing through the intake air passageway 4.

An adsorbent catalytic converter 10 is disposed in an exhaust gas passageway 9 so as to purify exhaust gas flowing through the exhaust gas passageway 9. The adsorbent catalytic converter 10 has a function to adsorb HC (hydrocarbons) of exhaust gas. The adsorbent catalytic converter 10 is provided with a catalyst temperature sensor 11 for detecting a temperature of a catalyst component in the adsorbent catalytic converter 10. The catalyst temperature sensor 11 is adapted to generate a detection signal representative of the catalyst component temperature. It will be understood that a common catalytic converter may be disposed in the exhaust gas passageway 9 and located upstream of the adsorbent catalytic converter 10. The detection signal generated respectively by the air flow meter 2, and the temperature sensors 6, 11 are input to a control unit 8.

The control unit 8 is constructed and arranged to control a timing, a time duration, frequencies of fuel injection from the fuel injector valve 4, in accordance with the above detection signals. More specifically, fuel injection of the fuel injector valve 5 is made around intake stroke in case that a homogeneous charge combustion is carried out upon supplying the combustion chamber 12 with a generally homogeneous air-fuel mixture, for example, at a full throttle power output of the engine. Otherwise, fuel injection of the fuel injector valve 5 is made around top dead center in compression stroke in case that a stratified charge combustion is carried out upon forming a relatively rich air-fuel mixture around the spark plug 7, for example, at a low load engine operating range. In this embodiment, additional fuel is controllably injected from the fuel injector valve 5 into the combustion chamber 12 during a time period including expansion stroke and exhaust stroke, for example, during an engine starting in a low temperature condition, in addition to fuel injection in the above-discussed normal manners. The additional fuel is burnt in the exhaust gas passageway 9 thereby to smoothly raise the temperature of a catalyst component in the catalytic element 14 of the adsorbent catalytic converter 10 so as to effectively activate the catalyst component.

The structure of the catalytic element 14 is illustrated in detail in FIG. 2. The catalytic element 14 includes a honeycomb-monolithic carrier 14b formed of ceramic or metal. The carrier 14b has a plurality of cells 14a which axially extend and through which exhaust gas passes. In this embodiment, each cell 14a is rectangular in cross-section and defined by upper and lower inner wall surfaces (not identified) and left-side and right-side inner wall surfaces (not identified). All the wall surfaces are coated with an adsorption layer 14c, serving as an inner coating layer. The adsorption layer 14c functions to adsorb HC component in exhaust gas. A catalytic layer 14d is coated on the adsorption layer 14c so as to cover the adsorption layer 14c, serving as a surface layer. The catalytic layer 14d contains the catalyst component for promoting reaction for purifying (oxidize and/or reduce) noxious gas components contained in exhaust gas. It will be understood that the catalytic element 14 is formed with the many axially extending cells 14a each of which is arranged as discussed above.

The adsorption layer 14c is formed of a material containing an adsorbent such as zeolite as a main component. The adsorbent may, for example, be one which is obtained by causing zeolite to be subjected to ion exchange with metal. The adsorbent has, in general, a characteristics to adsorb HC at a low temperature range (for example, 100° C. to 200° C.) and to release HC at a high temperature range which is on a higher side in temperature relative to the low temperature range, so that a part of the high temperature range may overlap a part of the low temperature range.

The catalytic layer 14d contains the catalyst component such as noble metal (platinum, palladium, rhodium, and the like). The catalyst component is a conventional three-way catalyst, or preferably the conventional three-way catalyst whose palladium content is higher than a usual level. The catalyst component is, in general, activated at a temperature (activation level) ranging from 200° C. to 300° C. thereby promoting reaction for purifying the noxious gas components in exhaust gas.

The adsorption layer 14c may contain the catalyst component in addition to the adsorbent, which will cause no problem. The adsorption layer 14c may include a plurality of layers which respectively contain different adsorbents. Similarly, the catalytic layer 14d may includes a plurality of layers which respectively contain different catalyst components. Otherwise, the inner wall surfaces defining each cell 14a may be coated with only one layer which is formed by mixing the catalyst component in the adsorption layer 14c. The adsorption layer 14c may be formed at the upstream-side of the catalytic element 14, in which the catalytic layer 14d is formed at the downstream-side of the catalytic element 14. The catalytic element 14 may include an upstream-side catalytic element having only the adsorption layer 14c, and a downstream-side catalyst element located downstream of and adjacent the upstream-side element, the downstream-side catalytic element having only the catalytic layer 14d. Thus, the construction of the catalytic element 14 is not limited to one of the above embodiment, and therefore it is sufficient that the catalytic element 14 includes the adsorption layer containing the adsorbent, and a catalyst component for promoting reaction for oxidizing HC released from the adsorption layer.

A basic operation of the exhaust gas purifying system P of this embodiment will be discussed.

The additional fuel is injected from the fuel injector valve into the combustion chamber 12 during the time period including expansion stroke and exhaust stroke in case that a result of a judgement is made in accordance with the catalyst component temperature detected by the catalyst temperature sensor 11, such that the temperature of the catalyst component has not reached the activation level; the temperature of the adsorption layer 14c has reached the releasing level at which HC can release or will immediately release from the adsorption layer 14c; and the temperature within the exhaust gas passageway 9 has reached a level at which HC is burnable within the exhaust gas passageway 9. The additional fuel is hardly combusted in the combustion chamber 12, and therefore an almost whole part of the additional fuel is discharged in its unburned state into the exhaust gas passageway 9 in the exhaust stroke of the engine. In other words, in the exhaust stroke, the additional fuel is discharged together with high temperature exhaust gas to the exhaust gas passageway 9, in which the additional fuel is converted into burnable gas in the exhaust gas passageway 9 in a high temperature condition and then is naturally burned in the exhaust gas passageway 9. Thus, such burned additional fuel effectively raises the temperature of exhaust gas within the exhaust gas passageway 9, thereby smoothly raising the temperature of the catalyst component in the catalytic element 14 of the adsorbent catalytic converter 10 and activating the catalyst component. Then, when the temperature of the catalyst component has reached the activation level, supply of the additional fuel from the fuel injector valve 5 is stopped.

Next, a manner of the operation of the exhaust gas purifying system P will be discussed with reference to a flowchart in FIG. 3, in which a routine of the flowchart is executed, for example, every 10 msec.

First at a step S1, a judgement is made as to whether the catalyst component in the catalytic element 14 of the adsorbent catalyst converter 10 has been activated or not, in accordance with the catalyst component temperature detected by the catalyst component temperature sensor 11. Specifically, a judgment is made as to whether the temperature of the catalyst component has reached the activation level (for example, 250° C.) or not. If the catalyst temperature sensor 11 is not provided, the catalyst temperature can be indirectly estimated, for example, from the temperature of the engine coolant. When a result of the judgment is made at the step S1 such that the catalyst component has been activated, it is unnecessary to further raise the temperature of the catalyst component, and therefore a flow goes to a step S5 at which a normal fuel injection control is carried out in which no additional fuel injection is made. When a result of the judgment is made such that the catalyst component is in an inactive state, the flow goes to a step S2.

At the step S2, a judgment is made as to whether HC has begun to release from the adsorption layer 14c, in accordance with the catalyst temperature detected by the catalyst temperature sensor 11. In other words, a judgment is made as to whether or not the temperature of the adsorption layer 14c has reached a releasing level (for example, 200° C.) at which HC can release or will immediately release. When a result of the judgment is made such that the temperature of the adsorption layer 14c has not reached the releasing level at the step S2, i.e., the adsorption layer 14c is in a low temperature range to adsorb HC, the flow goes to the step S5 in which the normal fuel injection control is carried out in which no additional fuel is injected. In contrast, when a result of the judgment is made such that the temperature of the adsorption layer 14c has reached the releasing level, the flow goes to a step S3.

At the step S3, a judgment is made as to whether or not a certain burning condition will be established within the exhaust gas passageway 9 upon the additional fuel being injected from the fuel injector valve 5 into the combustion chamber 12 during the time period including the expansion stroke and the exhaust stroke of the engine, in accordance with the temperature in the exhaust gas passageway 9 upstream of the adsorbent catalytic converter 10. In other words, a judgment is made as to whether or not the temperature of exhaust gas flown to the adsorbent catalytic converter 10 will suitably rise upon proceeding of burning of the additional fuel within the exhaust gas passageway 9, or not.

More specifically, such a judgment is made, for example, first by estimating a temperature of an exhaust port (not identified) or the like of the engine 1 from detection of the fact that a certain time has lapsed since engine starting, from detection of the fact that the temperature of the engine coolant detected by the coolant temperature sensor 6 has reached a certain level, or from a driving history of the engine since the engine starting, and then by detecting that the thus estimated temperature has reached a certain high level. In this regard, if the temperature of the exhaust port, an exhaust manifold (not identified), an exhaust pipe (not identified) or the like has been over the certain high level, it is judged that the additional fuel can be burnt within the exhaust gas passageway 9.

When the judgment at the step S3 provides such a judgement result that the certain burning condition will not be established within the exhaust gas passageway 9, the flow goes to the step S5 at which the normal fuel injection control is carried out in which no additional fuel is injected. This is because, even if the additional fuel is injected, a major part of the additional fuel in its unburned state flows into the absorbent catalytic converter 10 so that a rapid temperature rise of the catalyst component cannot be expected. In contrast, when the judgment at the step S3 provides such a judgment result that the certain burning condition will be established within the exhaust gas passageway 9, the flow goes to the step S4 at which the additional fuel is injected from the fuel injector valve 5 into the combustion chamber 12 during the time period including the expansion stroke and the exhaust stroke of the engine, as discussed above.

Thus, according to this embodiment, the additional fuel is injected from the fuel injector valve 5 into the combustion chamber 12 during the time period including the expansion stroke and the exhaust stroke of the engine when the temperature of the catalyst component has not reached the activation level; the temperature of the adsorption layer 14c has reached the certain releasing level; and the additional fuel is burnable within the exhaust gas passageway 9. In other words, the additional fuel is controllably injected from the fuel injector valve 5 when unburned HC adsorbed in the adsorption layer 14c will immediately release from the adsorption layer 14c before the catalyst component is activated with a temperature rise of exhaust gas, for example, after the engine starting in the low temperature condition. The injected additional fuel is discharged together with high temperature exhaust gas into the exhaust gas passageway 9 in the exhaust stroke of the engine and burned within the exhaust gas passageway 9. As a result, the temperatures within the exhaust gas passageway 9 and the adsorbent catalytic converter 10 are rapidly increased so that the temperature of the catalyst component in the adsorbent catalytic converter 10 smoothly reaches the activation level.

The adsorbent catalytic converter 10 of this embodiment has the catalytic element 14 which takes a multiple coating-layer structure in which the catalytic layer 14d is formed as the surface layer while the adsorption layer 14c is formed as the inner layer. Accordingly, during a temperature rise due to high temperature exhaust gas, first the temperature of the catalytic layer (surface layer) 14d rises, and then the temperature of the adsorption layer (inner layer) 14c gradually rises. This effectively shortens a time period between a time at which the temperature of the adsorption layer 14c has reached to the releasing level and a time at which the temperature of the catalytic layer 14d has reached the activating temperature, i.e., the time period in which the catalytic layer 14d is in the inactive state though HC has begun to release from the adsorption layer 14c. Additionally; if such a time period exits, the additional fuel is immediately injected from the fuel injector valve 5 thereby smoothly raising the temperature of the catalyst component. As a result, an almost whole amount of HC which has been released from the adsorption layer 14c with temperature rise of exhaust gas is oxidized and converted into harmless gases during passage through the catalytic element 14, so that HC is hardly discharged into the outside of the engine.

Next, a second embodiment of the exhaust gas purifying system P according to the present invention will be discussed with reference to a flowchart in FIG. 4. The flowchart shows a routine of a control, executed, for example, every 10 msec. The exhaust gas purifying system P of this embodiment is the same in mechanical construction as that of the first embodiment.

First, at a step S11, a judgment is made as to whether the catalyst component in the catalytic element 14 of the adsorbent catalytic converter 10 has been activated or not, in accordance with the catalyst component temperature detected by the catalyst temperature sensor 11. Specifically, a judgment is made as to whether the temperature of the catalyst component has reached the activation level (for example, 250° C.) at which the catalyst component is activated. When a result of the judgment is made such that the catalyst component has been activated, at the step S11, it is unnecessary to further raise the temperature of the catalyst component, and therefore a flow goes to a step S16 at which the normal fuel injection control is carried out in which no additional fuel injection is made. When a result of the judgment is made such that the catalyst component is in the inactive state, the flow goes to a step S12.

At the step S12, a judgment is made as to whether or not a first burning condition will be established within the exhaust gas passageway 9 upon the additional fuel being injected from the fuel injector valve 5 into the combustion chamber 12 during the time period including the expansion stroke and the exhaust stroke of the engine, in accordance with, for example, the temperature in the exhaust gas passageway 9 upstream of the adsorbent catalytic converter 10. In other words, a judgment is made as to whether or not the temperature of exhaust gas flown to the adsorbent catalytic converter 10 will sufficiently rise upon effective burning of the additional fuel within the exhaust gas passageway 9 so that the concentration of unburned HC flowing into the absorbent catalytic converter 10 is reduced as compared with that in case that the additional fuel is not injected. Specifically, such a judgment is made, for example, first by estimating a temperature of an exhaust port (not identified) or the like of the engine 1 from the fact that a certain time has lapsed since engine starting, from the fact that the temperature of the engine coolant detected by the coolant temperature sensor 6 has reached a certain level, or from a driving history of the engine since the engine starting, and then by detecting that the thus estimated temperature has reached a certain level (first threshold level) or not. At the step S12, when a result of the judgment is made such that the first burning condition will be established, the flow goes to a step S15 at which a control for injecting the additional fuel during the time period including the expansion stroke and the exhaust stroke is made and terminates this routine.

Thus, according to this embodiment, the additional fuel is immediately controllably injected from the fuel injector valve 5 regardless of the fact that the temperature of the adsorption layer 14c has reached the releasing level, in case that the judgment result is made such that the temperature of the catalyst component has not reached the activation level and that the additional fuel will be effectively burned within the exhaust gas passageway 9 upon injection of the additional fuel during the time period including the expansion stroke and the exhaust stroke so as to relatively reduce unburned HC to be flown into the adsorbent catalytic converter 10. As a result, for example, during the engine starting in a low temperature condition, the temperature of the catalyst component can be further smoothly raised to the activation level without accompanying an increase in emission of unburned HC.

When a judgment result is made at the step S12 such that the first burning condition will not be established, the flow goes to a step S13. At the step S13, a judgment is made as to whether or not the temperature of the adsorption layer 14c in the adsorbent catalytic converter 10 has reached the releasing level (for example, 200° C.) at which HC can release or will immediately release from the adsorption layer 14c. When a result of the judgement is made at the step S13 such that the temperature of the adsorption layer 14c has not yet reached the releasing level, the flow goes to the step S16 at which the normal fuel injection control is made in which no additional fuel is injected. When a result of the judgment is made at the step S13 such that the temperature of the adsorption layer 14c has reached the releasing level, the flow goes to a step S14.

At the step S14, a judgment is made as to whether or not a second burning condition will be established within the exhaust gas passageway 9 upon the additional fuel being injected from the fuel injector valve 5 into the combustion chamber 12 during the time period including the expansion stroke and the exhaust stroke of the engine, in accordance with, for example, the temperature in the exhaust gas passageway 9 upstream of the adsorbent catalytic converter 10. In other words, a judgment is made as to whether or not the additional fuel is burned to some extent within the exhaust gas passageway 9 so as to raise the temperature of exhaust gas in a manner that the concentration of unburned HC to be flown into the adsorbent catalytic converter 10 is not increased as compared with that in case that the additional fuel is not injected. Such a judgement is made, for example, first by estimating the temperature of the exhaust port (not identified) or the like of the engine 1 from the fact that a certain time has lapsed since engine starting, from the fact that the temperature of the engine coolant detected by the coolant temperature sensor 6 has reached a certain level, or from a driving history of the engine since the engine starting, and then by detecting that the thus estimated temperature has reached a certain level (second threshold level). The second threshold level is suitably set taking account of, for example, a rising-change of exhaust gas temperature upon injection of the additional fuel, and a change in quantity of unburned hydrocarbons flown into the adsorbent catalytic converter 10. The second threshold level is set lower than the first threshold level used to judge the first burning condition.

When a result of the judgement is made in the step S14 such that the concentration of HC to be flown into the absorbent catalytic converter 10 will be increased, the temperature of exhaust gas cannot be sufficiently raised so that much unburned HC is flown into the adsorbent catalytic converter 10 even if the additional fuel is injected. Therefore, the flow goes to the step S16 at which injection of the additional fuel is stopped in which the normal fuel injection control is made.

When a result of the judgement is made in the step S14 such that the exhaust gas temperature increases so that the concentration of HC to be flown into the absorbent catalytic converter 10 hardly increases upon injection of the additional fuel, the flow goes the step S15 at which the additional fuel is controllably injected. Accordingly, the temperature of the catalyst component can be smoothly raised to the activation level without increasing emission of unburned HC, thus further effectively lowering the emission of unburned HC.

It will be understood that a separate catalytic converter may be disposed in the exhaust gas passageway 9 upstream of the adsorbent catalytic converter 10, though not shown. In this case, when the additional fuel is burned, unburned HC is burned and reduced in the upstream-side separate catalytic converter so that the separate catalytic converter is rapidly heated, upon which exhaust gas from the separate catalytic converter heats the downstream-side adsorbent catalytic converter 10.

The entire contents of Japanese Patent Application P10-227474 (filed Aug. 12, 1998) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An exhaust gas purifying system for an internal combustion engine having a fuel injector valve for directly injecting fuel into a combustion chamber of the engine, comprising:

an adsorbent catalytic converter disposed in an exhaust gas passageway of the engine, said adsorbent catalytic converter including a catalytic element having an adsorption layer, said adsorption layer containing an adsorbent which is able to adsorb HC (hydrocarbons) of exhaust gas in a first temperature range and to release the adsorbed HC in a second temperature range which is higher than the first temperature range, and a catalyst component for promoting reaction for oxidizing HC which is released from said adsorbent; and a control unit programmed to carry out
judging whether a temperature of said adsorption layer has reached a releasing level so as to make a first judgment result;
judging whether a temperature of exhaust gas flowing into said adsorbent catalytic converter will rise upon injection of an additional fuel amount from said fuel injector valve into the combustion chamber during a time period including an expansion stroke and an exhaust stroke of the engine, so as to make a second judgment result;
judging whether a temperature of the catalyst component has not reached an activation level at which the catalyst component is activated, so as to make a third judgment result; and
causing said fuel injector valve to controllably inject the additional fuel amount during the time period including the expansion stroke and the exhaust stroke of the engine upon making the first judgment result that the temperature of said adsorption layer has reached the releasing level, the second judgment result that the temperature of exhaust flowing into said adsorbent catalytic converter will rise upon injection of the additional fuel amount, and the third judgment result that the temperature of the catalyst component has not reached the activation level.

2. An exhaust gas purifying system as claimed in claim 1, wherein said control unit is programmed to carry out
judging that a concentration of unburned HC to be flown into said adsorbent catalytic converter will increase upon injection of the additional fuel, so as to make a fourth judgment result; and
stopping injection of the additional fuel from said fuel injector valve upon making the fourth judgment result.

3. An exhaust gas purifying system as claimed in claim 1, wherein said control unit programmed to carry out
judging that a concentration of unburned HC to be flown into said adsorbent catalytic converter will decrease upon injection of the additional fuel, so as to make a fourth judgment result; and
causing said fuel injector valve to inject the additional fuel during the time period including the expansion stroke and the exhaust stroke of the engine regardless of the temperature of the adsorption layer.

4. An exhaust gas purifying system as claimed in claim 1, wherein said releasing level is slightly lower than or within the second temperature range so that HC adsorbed in said adsorbent is releasable at said releasing level or when the temperature of said adsorption layer exceeds said releasing level.

5. An exhaust gas purifying system for an internal combustion engine having a fuel injector valve for directly injecting fuel into a combustion chamber of the engine, comprising an adsorbent catalytic converter disposed in an exhaust gas passageway of the engine, said adsorbent catalytic converter including a catalytic element having an adsorption layer, said adsorption layer containing an adsorbent which is able to adsorb HC (hydrocarbons) of exhaust gas in a first temperature range and to release the adsorbed HC in a second temperature range which is higher than the first temperature range, and a catalyst component for promoting reaction for oxidizing HC which is released from said adsorbent;

means for judging whether a temperature of said adsorption layer has reached a releasing level so as to make a first judgment result;

means for judging whether a temperature of exhaust gas flowing into said adsorbent catalytic converter will rise upon injection of an additional fuel amount from said fuel injector valve into the combustion chamber during a time period including an expansion stroke and an exhaust stroke of the engine, so as to make a second judgment result;

means for judging whether a temperature of the catalyst component has not reached an activation level at which the catalyst component is activated, so as to make a third judgment result; and means for causing said fuel injector valve to controllably inject the additional fuel amount during the time period including the expansion stroke and the exhaust stroke of the engine upon making the first judgment result that the temperature of said adsorption layer has reached the releasing level, the second judgment result that the temperature of exhaust flowing into said adsorbent catalytic converter will rise upon injection of the additional fuel amount, and the third judgment result that the temperature of the catalyst component has not reached the activation level.

6. A process for purifying exhaust gas from an internal combustion engine having a fuel injector valve for directly injecting fuel into a combustion chamber of the engine, and equipped with an adsorbent catalytic converter disposed in an exhaust gas passageway of the engine, the adsorbent catalytic converter including a catalytic element having an adsorption layer, the adsorption layer containing an adsorbent which is able to adsorb HC (hydrocarbons) of exhaust gas in a first temperature range and to release the adsorbed HC in a second temperature range which is higher than the first temperature range, and a catalyst component for promoting reaction for oxidizing HC which is released from the adsorbent, said process comprising:

judging whether a temperature of said adsorption layer has reached a releasing level so as to make a first judgment result;

judging whether a temperature of exhaust gas flowing into said adsorbent catalytic converter will rise upon injection of an additional fuel amount from said fuel injector valve into the combustion chamber during a time period including an expansion stroke and an exhaust stroke of the engine, so as to make a second judgment result;

judging whether a temperature of the catalyst component has not reached an activation level at which the catalyst component is activated, so as to make a third judgment result; and causing said fuel injector valve to controllably inject the additional fuel amount during the time period including the expansion stroke and the exhaust stroke of the engine upon making the first judgment result that the temperature of said adsorption layer has reached the releasing level, the second judgment result that the temperature of exhaust flowing into said adsorbent catalytic converter will rise upon injection of the additional fuel amount, and the third judgment result that the temperature of the catalyst component has not reached the activation level.

* * * * *